Nov. 11, 1958  F. W. WARREN ET AL  2,859,482
BELTING
Filed July 16, 1954
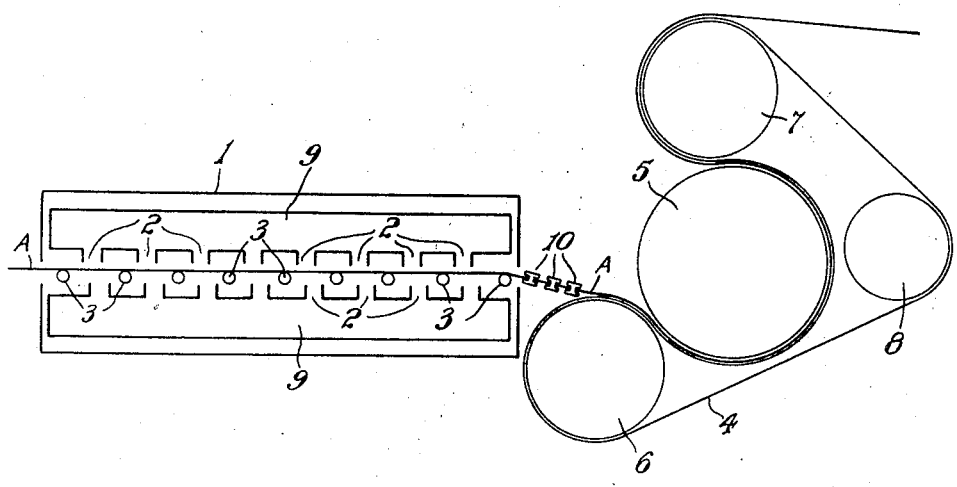
INVENTORS
Fredrich William Warren
John Douglas Crabbe
by Benj. T. Rauber
their attorneys

# United States Patent Office 2,859,482
Patented Nov. 11, 1958

2,859,482

BELTING

Fredrick William Warren, Liverpool, and John Douglas Crabbe, Wilmslow, England, assignors to Dunlop Rubber Company Limited, London, England, a British company Application July 16, 1954, Serial No. 443,950

6 Claims. (Cl. 18—56)

This invention relates to belting and in particular flat belting such as conveyor belting.

It is known to form such belting from fabric and vulcanised rubber but when the belting is used in places where the risk of fire is great, for example, coal mines, the inflammable nature of the rubber proves to be a source of danger.

It has been proposed to form belting of fabric and a non-inflammable thermoplastic material such as polyvinyl chloride. The methods usually employed for the manufacture of rubber belting are however unsatisfactory with such non-inflammable materials owing to the fact that these materials do not set on heating and it is the object of the present invention to provide a method for the continuous production of belting using such materials.

According to the present invention a method of manufacturing belting comprising one or more plies of textile fabric coated with a non-inflammable thermoplastic composition comprises passing the coated ply or plies through hot air to fuse the composition and then cooling the coated ply or plies while subjected to pressure between the peripheral surface of a rotating drum and an endless tensioned steel band following the contour of the drum surface.

Preferably the band engages the underside of the coated fabric and the band and fabric then pass through the nip between the main drum and an auxiliary drum. After passing more than half way round the circumference of the main drum the coated fabric and band pass through the nip between the main drum and another auxiliary drum and round this drum after which the coated fabric will have been cooled sufficiently for batching up.

Fusion of the composition may be effected by passing the coated fabric through a tunnel in which the hot air is directed onto it by means of nozzles or slots, the air being afterwards re-heated and re-circulated. An air temperature of 190° C.–200° C. is usually satisfactory.

According to a preferred embodiment of the invention illustrated in the accompanying drawing a single ply A of belting fabric is coated on both sides with a plasticised polyvinyl chloride composition and is then passed through a tunnel 1 wherein hot air emerging from slots or nozzles 2 in ducts 9 impinges directly on to both outer surfaces of the coated ply to fuse the compound. The ply is supported by rollers 3 which may be covered with a heat-resisting inert material such as polytetrafluorethylene or which may be in contact with licking rollers rotating in a trough of a heat-resistant lubricant such as silicone fluid. The hot air in the tunnel is returned to a heater and re-circulated.

The edges of the belting ply are shaped square on emerging from the tunnel by passing them between spring loaded U-profiled rollers 10 which bear on the edges. In a modification the rollers on each side are encircled by an endless steel band engaging the flat bases of the U's and the edges of the belting ply are shaped by contact with the outer surface of the band.

The underside of the coated ply A is then engaged by an endless flexible steel band 4, and the ply and band pass through the nip between a water-cooled rotating drum 5 and a lower drum 6 and are carried round the periphery of the cooled drum 5 for a distance of approximately two thirds of its circumference, during which period the ply is compressed between the band and the periphery of the drum. The ply A and band 4 then pass through the nip between the cooled drum 5 and an upper drum 7 and then round the upper drum 7. During its passage round the cooled drum 5 the coated ply is consolidated by the pressure exerted on it and the belting thus formed is sufficiently cool after passing round the upper drum to be stripped from the band and coiled up. The band follows a return path to the periphery of the lower drum round a tensioner 8.

In the production of belting having more than one ply of fabric, the belting structure is formed by loosely assembling superposed layers of coated fabric which are then passed through the hot air tunnel together. The speed at which the multi-ply structure passes through the tunnel is slower than that at which single ply belting moves in order to ensure adequate heat penetration of the inner fabric layers. For example in a tunnel which is traversed in 10 minutes by single ply belting, the time taken for a two ply assembly is approximately 15 minutes and for a five ply assembly approximately 20–25 minutes. On emerging from the tunnel the assembly is engaged by the steel band and carried through the nip between the cooled drum and the lower drum while the composition is still at the temperature of fusion and then carried round the cooled drum and the upper drum as described above with reference to single ply belting, the consolidated belting being afterwards stripped from the band as before.

If desired the belting may be provided with U-shaped edging strips as described in our co-pending Patent Application Ser. No. 403,838 filed January 13, 1954, now Patent No. 2,788,838, the strips being welded to the edges of the coated ply or plies by radio-frequency heaters before the fabric passes into the hot air tunnel.

Having now described our invention, what we claim is:

1. A method of manufacturing belting comprising coating at least one ply of textile material with a non-inflammable, thermoplastic composition, passing the coated material through a heating zone to fuse the composition, passing the ply and fused coating between a cooled surface moving in a curved path with said coated ply and a surface moving with said ply and tensioned against said cooled surface in said curved path to cause simultaneous consolidation of said ply and coating and setting of said coating under pressure.

2. The method of claim 1 in which said coating is subjected in said heating zone to hot air impinging on the surface of said coating.

3. The method of claim 1 in which said non-inflammable, thermoplastic composition comprises a polyvinyl compound.

4. The method of claim 3 in which said non-inflammable, thermoplastic composition is subjected in said heating zone to a temperature between 190° C. and 200° C.

5. The method of claim 1 in which the edges of the fabric are shaped to a square configuration while said composition is fused.

6. A method of manufacturing belting comprising coating at least one ply of textile material with a non-inflammable, thermoplastic composition, passing the coated material through a heating zone to fuse the composition, passing the ply and fused coating between a pair of surfaces, at least one of which is cooled, and which are under pressure toward each other, said ply and coating being between said surfaces to consolidate said ply and coating and cool said composition under pressure until said coating is set.

References Cited in the file of this patent

UNITED STATES PATENTS

| | | |
|---|---|---|
| 2,067,312 | Coryell | Jan. 12, 1937 |
| 2,142,972 | Bierer | Jan. 3, 1939 |
| 2,415,028 | Bosomworth | Jan. 28, 1947 |
| 2,442,443 | Swallow | June 1, 1948 |
| 2,515,778 | Knowland | July 18, 1950 |
| 2,540,962 | Puppolo | Feb. 6, 1951 |
| 2,609,568 | Getchell | Sept. 9, 1952 |
| 2,647,296 | Shive | Aug. 4, 1953 |
| 2,710,266 | Hochberg | June 7, 1955 |

OTHER REFERENCES

Organic Finishing, Dec. 1950, "Dispersion Coatings" by Sirota, pp. 11–15.